United States Patent [15] 3,644,267
Jackson, Jr. et al. [45] Feb. 22, 1972

[54] LOW-VISCOSITY HIGH-STRENGTH THERMOPLASTIC ADHESIVE

[72] Inventors: Winston J. Jackson, Jr.; John R. Caldwell, both of Kingsport, Tenn.

[73] Assignee: Eastman Kodak Company, Rochester, N.Y.

[22] Filed: Jan. 28, 1970

[21] Appl. No.: 6,645

[52] U.S. Cl. ............... 260/33.6 R, 260/30.6 R, 260/30.8 R, 260/31.8 M, 260/32.4, 260/33.8 R, 260/873
[51] Int. Cl. .................................. C08g 39/10, C08g 51/28
[58] Field of Search ............. 260/873, 33.8 R, 33.6 R; 117/161 K

[56] References Cited

UNITED STATES PATENTS

| | | | |
|---|---|---|---|
| 2,968,639 | 1/1961 | Caldwell | 260/33.8 |
| 3,247,162 | 4/1966 | Newland | 260/33.8 |
| 3,322,854 | 5/1967 | Yasui | 260/873 |
| 3,359,344 | 12/1967 | Fukushima | 260/873 |
| 3,361,848 | 1/1968 | Siggel | 260/873 |
| 3,397,169 | 8/1968 | Wilkinson | 260/873 |
| 3,423,482 | 1/1969 | Katsumura | 260/873 |
| 3,464,947 | 9/1969 | Robertson | 260/873 |
| 3,471,435 | 10/1969 | Miller | 260/40 |
| 3,142,434 | 7/1964 | Chapman | 260/33.6 |
| 3,354,114 | 11/1967 | Doyle | 260/873 |
| 3,386,935 | 6/1968 | Jackson | 260/33.8 |
| 3,398,014 | 8/1968 | Turner | 117/161 K |
| 3,421,974 | 1/1969 | Wiener | 260/33.8 |
| 3,436,367 | 4/1969 | McInerney | 117/161 K |
| 3,520,844 | 7/1970 | Pontius | 260/873 |

OTHER PUBLICATIONS

E. N. Doyle, " The Development and Use of Polyester Products," McGraw–Hill, Published Mar. 18, 1969, pp. 285, 300–302.

Bryan et al., Defensive Publication T870,004 Jan. 6, 1970, pages 1–6 and 9 of specification.

Primary Examiner—Morris Liebman
Assistant Examiner—P. R. Michl
Attorney—Cecil D. Quillen, Jr. and Charles R. Martin

[57] ABSTRACT

Low-viscosity high-strength thermoplastic adhesives comprising a thermoplastic linear polyester, a polymer of a monoolefinically unsaturated monomer, a viscosity decreasing additive and optionally a granular metallic material. Substrates such as sheets, film or shaped articles are bonded together with the adhesive, or single substrates are coated therewith as when surface defects are to be eliminated. Useful viscosity decreasing additives include chlorinated biphenyl, terphenyl and other aromatic compounds having a boiling point above about 250°. and a Tg below about 10° C.

6 Claims, No Drawings

LOW-VISCOSITY HIGH-STRENGTH THERMOPLASTIC ADHESIVE

This invention relates to thermoplastic adhesives having a desirable combination of low-melt viscosity and high-bond strength comprising a polyester, a polyolefin or vinyl-type polymer and an additive.

Thermoplastic adhesives, particularly polyesters, are of importance because of their high-adhesive strengths and speed of application, but are undesirable in one aspect because of the difficulty of application in in industrial equipment. Thus although strong adhesive bonds are obtained as soon as the adhesive cools, the adhesive in many cases has a melt viscosity so high that it is entirely impractical to extrude through orifices of industrial "guns" used to apply hot melt adhesives. This problem results in excessive pressure requirements used to apply the adhesive, which in turn results in a significant increase in the cost of applying the adhesive and a corresponding increase in cost of the manufactured article.

Recently adhesive compositions comprising blends of polyesters and other polymers, such as polyolefins, have achieved significant industrial prominence as hot melt adhesives due to their very high-adhesive strength, but the aforementioned problem of excessive melt viscosity is particularly acute. Thus, although very desirable bond strengths are obtained when polyesters are blended with polyolefins or vinyl-type polymers, the melt viscosity of these blends can reach a value at 250° C. of 2,000 poise, or even higher, and at these levels of viscosity the adhesive is impractical to use in standard adhesive applicators used in industry.

Although it is well known that various materials will reduce the melt viscosity of thermoplastic polymers, it is also known that such materials decrease the adhesive strength, particularly the peel strength, to an acceptably low level for practical industrial use.

Thus a dilemma is presented which eliminates the practical use of many hot-melt adhesive blends: either the polymer blend is used alone, in which case the adhesive strength is high and the melt viscosity is impractically high, or alternatively, the polymer blend is mixed with an additive, in which case the melt viscosity is reduced to a practical level but the adhesive strength is impractically low. We have, through this invention, entirely overcome this dilemma and provided a thermoplastic adhesive composition that is practical for industrial use in that the melt viscosity of the adhesive is reduced to a desirable level, but remarkably the adhesive strength, and particularly the peel strength, is far in excess of that required for typical industrial use.

British Pat. No. 1,066,781 discloses a thermoset polymer containing a diphenolic acid mixed with ethylene and styrene resins and a solvent such as biphenyl or a halogenated derivative thereof. It is said that higher concentrations of biphenyl in the solution appear to lower the viscosity. As is well known in the art, thermoset resins are impractical to use as hot-melt adhesives, and in addition the use of a polyester containing a carboxy substituted aromatic diol will result in extremely low-peel strength. Thus this invention, which comprises a thermoplastic adhesive composition having a modified ASTM D1876-61T peel strength at 23° C. of at least 10 lb./in. width, is entirely unobvious over this reference.

Accordingly, an object of this invention is to provide a thermoplastic adhesive with the combination of desirably low-melt viscosity and desirably high-adhesive strength. Another object of this invention is to provide a thermoplastic adhesive with the combination of desirably low-melt viscosity and outstanding peel strength. Another object of this invention is to provide a thermoplastic adhesive with increased heat transfer properties by incorporating a granular metallic material in the adhesive. Another object of this invention is to provide an article comprising a thermoplastic adhesive bonded to a substrate. Other objects, advantages and features of this invention will be readily apparent to those skilled in the art from the following description and appended claims.

Very broadly this invention is a composition useful as a hot-melt adhesive comprising a thermoplastic linear polyester, a polymer of a monoolefinically unsaturated monomer such as a polyolefin or a vinyl-type polymer and a viscosity decreasing additive having a boiling point above 250° C. and a Tg (glass transition temperature) below 10° C. In one embodiment granular metallic material can be added to the composition. In another embodiment an article is formed by bonding the adhesive to a substrate.

More specifically this invention comprises a composition, based on the weight of the total composition, of A. about 25–95 percent by weight of a thermoplastic linear polyester of an acid component selected from the group consisting of aliphatic acids containing two to 30 carbon atoms, terephthalic, isophthalic, hexahydroterephthalic, and hexahydroisophthalic and mixtures thereof, and a diol component comprising an aliphatic diol containing two to six carbon atoms and mixtures thereof, B. about 1–30 percent by weight of a polyolefin or a vinyl-type polymer, and C. about 50–50 percent by weight of a viscosity decreasing additive having a boiling point above 250° C. and a Tg below 10° C. selected from the group consisting of 1. an unsubstituted aromatic compound, and
2. an aromatic compound containing a substituent on the compound or divalent group between aromatic rings of the compound selected from the group consisting of halogen, oxygen, alkylene containing from one to 12 carbon atoms, alkyl containing from one to 12 carbon atoms, a nitro group, an oxy group, a hydroxyl group, a thio group, a sulfonyl group, a sulfonamide group, a phosphate group, a carboxamide group, and a monovalent—COOR radical wherein R contains from one to 12 carbon atoms and is alkyl or aryl and mixtures thereof.

The thermoplastic linear polyesters of this invention can be prepared from an acid component comprising a branched or unbranched aliphatic acid containing from two to 30 carbon atoms. Particularly adapted for the practice of this invention are aliphatic acids containing six to nine carbon atoms and more particularly adipic and sebacic acid are useful as the acid component in this invention. Additionally, the acid component in this invention can comprise terephthalic or isophthalic acid as well as their saturated derivatives, hexahydroterephthalic and hexahydroisophthalic acid. In one embodiment trans-1,4-cyclohexanedicarboxylic acid can be used. According to this invention, trans-1,4-cyclohexanedicarboxylic acid means the isomers of hexahydroterephthalic acid wherein at least 95 weight percent of the acid is the trans isomer. Particularly preferred acids are terephthalic and trans-1,4-cyclohexanedicarboxylic acid. In this invention mixtures of these acids can be used. In one embodiment at least 80 mole percent of the above noted acids, or mixtures thereof, can be used.

The diol used to prepare the polyester used in this invention is a branched or unbranched aliphatic glycol which can contain from two to six carbon atoms. Examples of such glycols are ethylene glycol, diethylene glycol, 1,2-propylene glycol, 1,4-butanediol, 1,6-hexanediol, 1,3-pentanediol, 2,2-dimethyl-1,3-propanediol, 1,4-cyclohexanediol. Particularly desirable results are obtained when ethylene glycol and 1,4-butanediol are used. Preparation of the polyester with mixtures of the above glycols are fully within the scope of this invention. In one embodiment at least 80 mole percent of the above noted glycols, or mixtures thereof, can be used.

The polyesters of this invention have an inherent viscosity of at least 0.5 and a crystallinity of at least 5 percent and are prepared by conventional techniques, preferably by ester interchange of glycols and dialkyl esters of dicarboxylic acids or by acidolysis of diol acetates with dicarboxylic acids. Mixtures of more than one polyester can be used in this invention.

According to this invention, based on the weight of the total composition, the polyester can comprise about 25–95 percent by weight, and more specifically about 35-85 percent by weight and in a preferred embodiment comprises about 40-80 percent by weight.

Particularly desirable polyesters useful with this invention include poly(ethylene terephthalate), poly(1,4-tetramethylene terephthalate), the polyester of the trans-1,4-cyclohexanedicarboxylic acid and 1,4-butanediol and mixtures of these polyesters.

The polymers of monoolefinically unsaturated monomers which are useful include polyolefins, vinyl-type polymers, and other types of monoolefinically unsaturated monomers.

A broad variety of polyolefins are useful in this invention. Typical examples of suitable polyolefins include polystyrene, poly(alpha-methylstyrene), poly(p-chlorostyrene), polyethylene, polypropylene, polybutene-1, poly(4-methylpentene), and poly(allylbenzene). Polystyrene and copolymers of styrene containing up to about 50 weight percent styrene are particularly useful for the production of melt adhesives that are required to retain their bond strength at relatively high temperatures. Softer types such as polyethylene and polyisobutylene are useful for improving the flow properties of the blend and also for improving the low-temperature adhesive properties. The polymers can be of the amorphous type or they may be stereoregular types. Other olefin-type polymers which may be used are listed in U.S. Pat. No. 3,239,582, column 2, lines 10-47.

Copolymers of olefins such as styrene-ethylene, styrene-butylene, propylene-ethylene, butylene-ethylene, etc., are useful in this invention. Mixtures of olefin homopolymers or copolymers are fully within the scope of this invention.

In general, any type of vinyl polymer is useful in practicing the invention, providing it is stable under the conditions used to form the adhesive bond. These polymers are derived from polymerizable compounds containing a

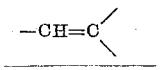

group or more especially a

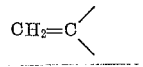

group. Copolymers of vinyl-type polymers are also useful with this invention, as well as copolymers of olefins and vinyl-type monomers such as ethylene-vinyl acetate, ethylene-methyl acrylate, ethylene-acrylic acid, styrene-acrylic acid, styrene-methyl methacrylate, etc., and mixtures thereof.

In this invention the polyolefin or vinyl-type polymer can comprise, based on the weight of the total composition, about 1-30 percent by weight and in one embodiment can comprise from about 5-25 weight percent and in a preferred embodiment can comprise from about 10-20 weight percent.

Blending of the polyesters with the polyolefins or vinyl polymers can be carried out by various common procedures, including mechanical mixing of the particles, blending on hot rolls, mixing in the melt, or mixing in solution and then removing the solvent.

According to this invention, the additives which result in the adhesive composition having the desirable combination of high-bond strength and low-melt viscosity have an atmospheric pressure boiling point above 250° C., and in some embodiments a boiling point above 300° C. The boiling point is advantageously above 250° C. so that the additives will not diffuse or volatilize out of the polymer blend during application of the molten adhesive. Additionally, the viscosity decreasing additives of this invention have a glass transition temperature, abbreviated Tg, below 10° C. The glass transition temperature of the additive is in general a measure of its ability to decrease the melt viscosity of the polyester, thus the lower the Tg, the greater the reduction in melt viscosity. The additives of particular interest, therefore, are those with Tg's below 10° C. and, in some embodiments, below −30° C. Since bulky, rigid molecules tend to have relatively high Tg's this Tg limitation will restrict the aromatic compounds which can be added. Chlorinated terphenyl containing 60 percent chlorine, for instance, has a Tg of 55° C. and is not suitable for the practice of our invention.

A listing of a few of the many additives useful with this invention, together with the glass transition temperatures of these additives, is given below.

| Additive | Tg. °C. |
|---|---|
| Chlorinated biphenyl, 60% Cl | −13 |
| Chlorinated biphenyl, 54% Cl | −24 |
| Chlorinated biphenyl, 42% Cl | −55 |
| Chlorinated biphenyl, 32% Cl | −68 |
| Chlorinated biphenyl, 21% Cl | −78 |
| o-terphenyl | −31 |
| Chlorinated terphenyl, 42% Cl | 3 |
| Triphenyl phosphate | −66 |
| Tricresyl phosphate | −61 |
| Dibutyl phthalate | −97 |
| Dioctyl phthalate | −97 |

The glass transition temperatures (Tg) of the additives of this invention are determined with quenched samples by differential thermal analysis as described in *J. Phys. Chem.*, 68, 1750(1964). Quenching of the sample is achieved by heating above the melting point (if a solid) and then quickly cooling in liquid nitrogen.

More specifically, the additive useful according to this invention includes an unsubstituted aromatic compound or an aromatic compound containing a substituent on the compound or a divalent group between aromatic rings of the compound selected from the group consisting of halogen, oxygen, alkyl containing from one to 12 carbon atoms, alkylene containing from one to 12 carbon atoms, a nitro group, an oxy group, a hydroxyl group, a thio group, a sulfonyl group, a sulfonamide group, a phosphate group, a carboxamide group, and a monovalent—COOR radical wherein R contains from one to 12 carbon atoms and is alkyl or aryl. Mixtures of these additives can be used.

Examples of additives that can be used include biphenyl, chlorinated biphenyls containing up to about 70 percent chlorine, terphenyl, chlorinated terphenyls containing up to about 50 percent chlorine, 1-chloronaphthalene, 2,6-dichloronaphthalene, pentachlorobenzene, hexachlorobenzene, 1,3,5-tribromobenzene, 4,4'-dibromodiphenyl, diphenyl ether, 4,4'-dichlorodiphenyl ether, 4,4'-dibromodiphenyl ether, diphenyl sulfide, diphenyl sulfone, o-phenylphenol, 2-naphthol, p-toluene-sulfonamide, N-ethyl-p-toluenesulfonamide, n-butylbenzamide, benzanilide, 4-nitrobiphenyl, 2,5-dichloronitrobenzene, octyl benzoate, dimethyl phthalate, dioctyl phthalate, triphenyl phosphate, tricresyl phosphate, 2-biphenyl diphenyl phosphate, tri-(o-chlorophenyl)phosphate. Mixtures of these additives can be used. The preferred additives are terphenyl and chlorinated biphenyls containing up to about 70 weight percent chlorine because of their outstanding ability to provide the combination of low-melt viscosity and high-bond strength, particularly peel strength. Particularly preferred additives are chlorinated biphenyls containing 30-60 weight percent chlorine.

About 5-65 weight percent, based on the total weight of composition, can be used and in a further embodiment about 5-35 weight percent can be used and preferably about 10-30 weight percent can be used.

At least 1.0 weight percent granular metallic material, based on the total weight of the polyester, polyolefin or vinyl-type polymer, additive and metallic material, can be added to the composition to increase the heat transfer characteristics of the adhesive and thus decrease the heating requirements for the adhesive application equipment. In one embodiment up to about 20 weight percent, based on the total weight of the polyester, polyolefin or vinyl-type polymer, additive and metallic material, can be used. Although almost any metal can be used, aluminum is particularly satisfactory because of its desirable heat transfer characteristics and availability.

Substances which can serve as sheets, films, shaped articles or other substrate components which may be laminated by the adhesives of this invention include synthetic resins, such as polyepoxide, as well as other substances such as paper, cardboard, metals (such as steel, chrome-plated steel, iron, aluminum, chromium, copper, brass, bronze, nickel, zinc, titanium, and tin), wood, glass, leather, ceramic materials, and fabrics. The fabrics may be natural or synthetic fibers or blends of fibers, including cotton, wool, silk, polyesters, polyamides, cellulose esters, regenerated cellulose, and acrylics. The same or different materials may be laminated in one structure. It is generally advisable to clean the surfaces of the components to be laminated just prior to formation of the melt adhesive bonds to remove foreign matter, grease, oxide coatings, etc., which might interfere with the formation of strong bonds.

In one embodiment of the invention, the adhesive composition can be applied in molten form with a spatula or regular extrusion equipment to the surfaces of the components to be bonded and the surfaces then brought together.

In another embodiment of this invention, a preformed film of the adhesive composition of this invention, for example 2 to 6 mils in thickness, can be placed between the surfaces of the structures to be bonded, after which the surfaces are clamped together with a pressure of several pounds per square inch and heat is applied by placing the clamped structure in a forced-air oven, a hot oil bath, a metal bath or similar environment so as to heat the preformed film to a temperature about 20° to 50° C. above its melting point.

In one preferred embodiment the adhesive composition is used as an "organic solder" to fill voids or cracks in goods during a manufacturing operation. Thus, typically, a manufactured article, such as an automobile, having cracks between the various elements joined to make the finished article, such as fenders, body pieces, etc., is subjected to an operation wherein joints or cracks are "filled" with the adhesive composition of this invention. The adhesive of the invention is ideal for use in this embodiment since the bond strength of the adhesive is desirably high, particularly the T-peel strength, and the melt viscosity of the adhesive is desirably low so as to be readily extrudable in industrial equipment and to "flow" readily into small cracks and void spaces. Use of the adhesive in automotive manufacture is also very desirable since, among many advantages, the bonded adhesive is sandable, paintable and has good resistance to enamel baking temperatures.

According to another embodiment of this invention, a single substrate is coated with the adhesive composition, for example, when defects on the substrate surface are to be eliminated.

When fabrics are bonded according to this invention an additional consideration is encountered since many fabrics cannot withstand the heat required for making melt adhesive bonds. In this embodiment the fabrics can be bonded by applying the adhesive dissolved in a volatile solvent, such as chloroform and the solvent then removed by evaporation such as by heating the bonded structure in an oven.

Fillers and pigments, such as very finely divided silica, alumina, or calcium carbonate, glass fibers as well as glass cloth may be incorporated into the adhesive layer to increase the bonding strength, temperature resistance and other properties. Antioxidants and stabilizers also may be incorporated therein to improve the thermal and oxidative stability of the adhesive at elevated temperatures.

The following examples will further illustrate the invention. In the examples, all polyesters are prepared by conventional procedures from glycols and dialkyl esters of dicarboxylic acids. Inherent viscosities are determined at a concentration of 0.25 g./100 ml. in 60/40 parts by weight of phenol/tetrachloroethane at 25° C. Abbreviations of acid derivatives used in preparing the polyesters are given below.

| Adipic | A |
| trans-1,4-cyclohexanedicarboxylic | C |
| 2,6-Naphthalenedicarboxylic | N |
| Sebacic | S |
| Terephthalic | T |
| Isophthalic | I |

Abbreviations of glycols used in preparing the polyesters are given below.

| Ethylene glycol | EG |
| 1,4-butanediol | B4 |
| Neopentyl glycol | NPG |

Blend Preparation

The polyester and polyolefin are granulated to pass a 20-mesh screen and the additive is then deposited on the particles by dissolving the additive in acetone and stirring the additive solution with the particles while the solvent is allowed to evaporate. The particles are then dried in a vacuum oven at 80° C., extruded in a screw-fed extruder, and granulated to pass a 20-mesh screen.

Melt Viscosity

Melt viscosities are determined at 240° C. with an Instron Capillary Rheometer, Model A70. Shear rate was 475 sec.$^{-1}$.

Melting Point

The melting points of the blends are determined with a differential scanning calorimeter, according to methods well known in the art.

Specimen Preparation and Testing

The T-peel strengths of laminates with metallic specimens are measured using an Instron tensile tester in accordance with a modified ASTM D1876-61T procedure using precut specimens. The specimens, 1 in. wide strips, are degreased by washing three times with Alconox, a detergent solution commercially available from Alconox, Inc., and rinsing in water each time. The specimens are then rinsed with acetone and allowed to dry in air. A metal specimen is then heated sufficiently on a hot plate for the adhesive composition to melt when applied as 20-mesh particles. A hot plate temperature of 240°-260° C. is satisfactory for most of the adhesive composition blends, but blends having higher melting temperatures require 280°-300° C. After the molten adhesive composition is evenly spread on the specimen over a 2 in. length with a wooden spatula, a second top piece of metal is pressed against the coated side of the sample. The sample is then turned over on the hot plate with the second metal strip against the hot plate surface. Heating is continued while the wooden spatula is rubbed back and forth over the metal in contact with the adhesive area until a smooth, even glue line between the metal strips is obtained (about 30 sec.). Then the specimen is placed on the laboratory bench and rubbing continued for about 20 seconds longer while the adhesive cools. This method of forming the adhesive bonds gives reproducible results similar to those obtained by clamping the specimen together and heating in a forced-air oven 20° to 50° C. above the polymer melting point. Glue lines are about 3 to 5 mils in thickness. The T-peel strengths of the laminates listed in Tables 1, 2 and 3 are determined at 23° C. with 0.012 inch thick aluminum, type 1100, and with 0.0065 inch chrome-coated steel.

The tensile shear strength data in Table 1 are determined at 120° C. by a modification of ASTM D1002-64 wherein there is used the above 0.0065 inch chrome-coated steel specimens. These specimens are cleaned as described above and the adhesive bonds formed in the same manner but with 0.25-in overlap.

A first series of runs are presented in Table 1 which illustrate the desirable combination of low melt viscosity and high bond strength when various additives are blended with a polymer mixture of 85 weight percent poly(1,4-tetramethylene terephthalate) and 15 weight percent Styrene 686 polystyrene commercially available from the Dow Chemical Company. The percentage of additive given in Table 1 is based on the combined weight of polyester, polystyrene and additive. The inherent viscosity of the polyester used in Table 1 is 1.15.

various values to a lower value in the range of 400-600 poise (runs 9-10). During this extreme decrease in viscosity the

TABLE 1 [1]

| Run No. | Additive Type | Weight, percent | Melt viscosity, poise | T-peel strength, lbs./in. width Al | T-peel strength, lbs./in. width Chrome coated steel | Tensile shear, p.s.i. |
|---|---|---|---|---|---|---|
| 1 | None control | | 3,440 | 23 | 45 | 1,320 |
| 2 | Biphenyl | 20 | 1,200 | 28 | 43 | 1,070 |
| 3 | do | 30 | 820 | 22 | 47 | 980 |
| 4 | do | 40 | 450 | 28 | 42 | 890 |
| 5 | do | 50 | | 22 | 38 | 700 |
| 6 | Chlorinated biphenyl, 21 weight percent Cl. | 30 | 550 | 23 | 43 | 920 |
| 7 | Chlorinated biphenyl, 32 weight percent Cl. | 20 | 1,480 | 27 | 43 | 1,030 |
| 8 | do | 30 | 950 | 32 | 49 | 900 |
| 9 | do | 40 | 620 | 29 | 40 | 720 |
| 10 | do | 50 | 420 | 12 | 43 | 500 |
| 11 | Chlorinated biphenyl, 60 weight percent Cl. | 15 | 2,200 | 28 | 45 | 1,000 |
| 12 | do | 30 | 1,190 | 16 | 33 | 670 |
| 13 | Terphenyl | 15 | 1,610 | 21 | 43 | 1,020 |
| 14 | do | 40 | 490 | 17 | 42 | 720 |
| 15 | Chlorinated terphenyl, 42 weight percent Cl. | 15 | 1,700 | 25 | 40 | 1,010 |
| 16 | Pentachlorobenzene | 15 | 1,500 | 23 | | 1,000 |
| 17 | 1,3,5-tribromobenzene | 15 | 1,550 | 20 | | 980 |
| 18 | 2,6-dichloronaphthalene | 15 | 1,800 | 17 | | |
| 19 | Diphenyl ether | 15 | 2,240 | 17 | 45 | 1,020 |
| 20 | Diphenyl sulfide | 15 | 2,300 | 18 | | |
| 21 | Diphenyl sulfone | 15 | 2,400 | 18 | 40 | 1,000 |
| 22 | o-Phenylphenol | 15 | | 20 | 53 | 980 |
| 23 | p-Toluenesulfonamide | 15 | 2,680 | 18 | 34 | |
| 24 | 4-nitrobiphenyl | 15 | 1,750 | 19 | 40 | 1,000 |
| 25 | Dioctyl phthalate | 15 | 1,330 | 20 | 36 | 960 |
| 26 | Benzanilide | 15 | 1,500 | 17 | | 970 |
| 27 | Tricresyl phosphate | 15 | 1,820 | 21 | 45 | 920 |
| 28 | do | 10 | 2,270 | 24 | 46 | 1,010 |
| 29 | Dibutyl phthalate | 20 | 1,150 | 25 | 42 | 900 |

[1] Tensile shear strength determined at 120° C. at 23° C. the steel fails and all adhesive bonds hold, indicating the shear strength of the adhesive is greater than the 1,900 p.s.i. strength of the metal. (0.0065 inch chrome-coated steel.)

As indicated by these data, addition of the additives of this invention decrease the melt viscosity while the bond strength of the adhesive composition remains at a desirable level. Specifically, note runs 7-10 wherein chlorinated biphenyl containing 32 weight percent chlorine is added to the polymer mixture in quantities from 20-50 weight percent. In these runs, which are fully illustrative of this invention, the viscosity decreased from a control value of 3,440 poise (run 1) through bond strength, particularly the peel strength, generally remains at the same order of magnitude as the control, and in every case is high enough for use in a wide variety of industrial applications.

A second series of runs are conducted wherein various acids and glycols are used and the resulting polyester blended with varying amounts of several olefins and varying amounts of different additives. Results of these runs appear in Table 2.

TABLE 2

| Run No. | Polyester[a] Acid | Polyester[a] Diol | I.V. | Polyolefin Type | Polyolefin Weight percent[b] | Additive Type | Additive Weight percent[c] | T-peel strength, lbs./in. width Al | T-peel strength, lbs./in. width Chrome-coated steel |
|---|---|---|---|---|---|---|---|---|---|
| 1 | T | EG | 1.01 | | | | | 23 | 20 |
| 2 | T | EG | 1.01 | Polystyrene | 15 | | | 25 | 35 |
| 3 | T | EG | 1.01 | do | 15 | Cl biphenyl, 32 weight percent Cl | 20 | 31 | 42 |
| 4 | T | EG | 1.01 | do | 15 | Triphenyl phosphate | 20 | 28 | 33 |
| 5 | T | B4 | 1.15 | | | | | 9 | 21 |
| 6 | T | B4 | 1.15 | Polystyene | 5 | | | 15 | 22 |
| 7 | T | B4 | 1.15 | do | 5 | Cl biphenyl, 32 weight percent Cl | 20 | 18 | 19 |
| 8 | T | B4 | 1.15 | do | 25 | | | 20 | 27 |
| 9 | T | B4 | 1.15 | do | 25 | Cl biphenyl, 32 weight percent Cl | 20 | 24 | 23 |
| 10 | T | B4 | 1.15 | do | 25 | Diphenyl ether | 20 | 20 | 29 |
| 11 | T | B4 | 1.15 | do | 25 | Dibutyl phthalate | 30 | 18 | 24 |
| 12 | C | B4 | 1.16 | | | | | 4 | 22 |
| 13 | C | B4 | 1.16 | Polystyrene | 15 | | | 19 | 30 |
| 14 | C | B4 | 1.16 | do | 15 | Cl biphenyl, 60 weight percent Cl | 10 | 23 | 44 |
| 15 | C | B4 | 1.16 | do | 15 | do | 25 | 29 | 41 |
| 16 | C | B4 | 1.16 | do | 15 | do | 30 | 18 | 40 |
| 17 | C | B4 | 1.16 | do | 15 | Dibutyl phthalate | 20 | 22 | 35 |
| 18 | C | B4 | 1.16 | do | 15 | o-Phenylphenol | 20 | 20 | 39 |
| 19 | C | B4 | 1.16 | do | 15 | o-Terphenyl | 20 | 23 | 36 |
| 20 | C | B4 | 1.16 | do | 15 | Triphenyl phosphate | 20 | 16 | 38 |
| 21 | C | B4 | 1.16 | do | 15 | Diphenyl ether | 25 | 24 | 36 |
| 22 | C | B4 | 1.16 | do | 25 | | | 25 | 27 |
| 23 | C | B4 | 1.16 | do | 25 | Cl biphenyl, 32 weight percent Cl | 20 | 29 | 38 |
| 24 | C | B4 | 1.16 | do | 25 | Diphenyl sulfone | 15 | 23 | 30 |
| 25 | C | B4 | 1.16 | Polyethylene | 15 | | | 9 | 20 |
| 26 | C | B4 | 1.16 | do | 15 | o-Terphenyl | 20 | 15 | 24 |
| 27 | C | B4 | 1.16 | Poly (1-butene) | 15 | | | 9 | 20 |
| 28 | C | B4 | 1.16 | do | 15 | Diphenyl ether | 20 | 16 | 30 |

[a] Abbreviations are as indicated previously. [b] Based on combined weight of polyester and polyolefin. [c] Based on combined weight of polyester, polyolefin and additive.

As is noted from data in Table 2, the T-peel strength of the adhesive composition of the invention is substantially higher than the polyester alone and is in the same order of magnitude as the polyester and polyolefin alone, and in many cases the T-peel strength of the low viscosity composition of the invention is actually higher than the polyester and polyolefin alone without the additive.

A third series of runs are conducted wherein various mixtures of acids are condensed with various glycols and the resulting copolyester mixed with varying amounts of different polyolefins and varying amounts of different additives. These data are presented in Table 3.

tetramethylene terephthalate), (3) a polyester of the trans-1,4-cyclohexanedicarboxylic acid and 1,4-butanediol and (4) mixtures thereof, B. about 5 to 25 weight percent of a polymer selected from the group consisting of polystyrene, poly(α-methylstyrene), poly(p-chlorostyrene), polyethylene, polypropylene, polybutene-1, poly(4-methylpentene), poly(allyl-benzene), styrene-ethylene copolymer, styrene-butylene copolymer, propylene-ethylene copolymer, butylene-ethylene copolymer, ethylene-vinyl acetate copolymer, ethylene-methyl acrylate copolymer, ethylene acrylic acid copolymer, styrene-acrylic acid

TABLE 3

| | Polyester a | | | Polyolefin | | Additive | | T-peel strength, lbs./in. width—Al |
|---|---|---|---|---|---|---|---|---|
| Run No. | Acid | Diol | I.V. | Type | Weight percent b | Type | Weight percent c | |
| 1 | 85/15 T/I | B4 | 0.71 | | | | | 11 |
| 2 | | | | Polystyrene | 15 | | | 20 |
| 3 | | | | do | 15 | Cl biphenyl, 32 weight percent Cl | 20 | 18 |
| 4 | | | | Polyethylene | 15 | Diethyl phthalate | 15 | 18 |
| 5 | 50/50 T/S | EG | 0.86 | | | | | 21 |
| 6 | | | | Polystyrene | 15 | | | 28 |
| 7 | | | | do | 15 | Cl biphenyl, 60 weight percent Cl | 30 | 25 |
| 8 | | | | do | 15 | 1,3,5-tribromobenzene | 15 | 24 |
| 9 | | | | do | 15 | Diphenyl sulfide | 15 | 25 |
| 10 | | | | do | 15 | Diphenyl sulfone | 20 | 23 |
| 11 | 80/20 N/A | NPG | 0.66 | | | | | 17 |
| 12 | | | | Polystyrene | 15 | | | 29 |
| 13 | | | | do | 15 | Cl terphenyl, 42 weight percent Cl | 20 | 26 |
| 14 | | | | do | 15 | n-Ethyltoluenesulfonamide | 20 | 28 |
| 15 | | | | Polyethylene | 15 | n-Butylbenzamide | 20 | 28 | a Abbreviations are as listed previously. Ratios are molar.  b Based on combined weight of polyester and polyolefin.
c Based on combined weight of polyester, polyolefin and additive.

These data conclusively indicate the operability of this invention when various acids are used to form copolyesters. Note that T-peel strength data are similar to those in Table 2 wherein homopolyesters are used.

A fourth series of runs are conducted to illustrate the embodiment of the invention wherein a granular metallic material is added to the polyester, polyolefin and additive composition. A first portion of the composition of Run 7, Table 1 is subjected to thermal conductivity tests using methods well known in the art and the thermal conductivity is determined to be $5.6 \times 10^{-4}$ cal./cm./sec./° C. A second portion of the same composition is ground to 20-mesh particles and mixed with a sufficient quantity of a commercially available aluminum powder, Alcoa No. 422, to give a composition wherein the aluminum comprises 5 weight percent, based on the weight of the total composition including aluminum powder. This composition is extruded in a screw-fed extruder and granulated to pass a 20-mesh screen. The thermal conductivity of this second portion containing aluminum powder is determined by the same method as used for the first portion to be $7.6 \times 10^{-4}$ cal./cm./sec./ C., which is 36 percent higher than for the first portion containing no aluminum powder. Similar increases of up to 45 percent, and even higher, can be obtained when higher percentages of aluminum are used. T-peel strength is essentially as indicated in the previously given data.

The invention has been described in detail with particular reference to preferred embodiments thereof, but it will be understood that various modifications can be effected within the spirit and scope of the invention.

We claim:
1. A composition useful as a hot-melt adhesive comprising, based on the weight of the composition, a blend of
   A. about 35 to 85 weight percent of a linear thermoplastic polyester selected from the group consisting of (1) poly(ethylene terephthalate), (2) poly(1,4-tetramethylene terephthalate), (3) a polyester of the trans-1,4-cyclohexanedicarboxylic acid and 1,4-butanediol and (4) mixtures thereof,
   B. about 5 to 25 weight percent of a polymer selected from the group consisting of polystyrene, poly(α-methylstyrene), poly(p-chlorostyrene), polyethylene, polypropylene, polybutene-1, poly(4-methylpentene), poly(allyl-benzene), styrene-ethylene copolymer, styrene-butylene copolymer, propylene-ethylene copolymer, butylene-ethylene copolymer, ethylene-vinyl acetate copolymer, ethylene-methyl acrylate copolymer, ethylene acrylic acid copolymer, styrene-acrylic acid copolymer, styrene-methyl methacrylate copolymer and mixtures thereof, and
   C. about 5 to 35 weight percent of terphenyl.

2. The composition of claim 1 containing at least 1.0 weight percent granular metallic material based on the weight of the composition.

3. The composition of claim 2 wherein the metallic material is aluminum.

4. A substrate coated with a hot melt adhesive composition comprising, based on the total weight of the composition,
   A. about 35–85 weight percent of a linear thermoplastic polyester selected from the group consisting of (1) poly(ethylene terephthalate), (2) poly(1,4-tetramethylene terephthalate), (3) a polyester of the trans-1,4-cyclohexanedicarboxylic acid and 1,4-butanediol, and (4) mixtures thereof,
   B. about 5 to 25 weight percent of a polymer selected from the group consisting of polystyrene, poly(α-methylstyrene), poly(p-chlorostyrene), polyethylene, polypropylene, polybutene-1, poly(4-methylpentene), ply(allyl-benzene), styrene-ethylene copolymer, styrene-butylene copolymer, propylene-ethylene copolymer, butylene-ethylene copolymer, ethylene-vinyl acetate copolymer, ethylene-methyl acrylate copolymer, ethylene-acrylic acid copolymer, styrene-acrylic acid copolymer, styrene-methyl methacrylate copolymer, and mixtures thereof, and
   C. about 5 to 35 weight percent of terphenyl.

5. Coated substrate of claim 4 containing at least 1.0 weight percent granular metallic material based on the weight of the composition.

6. The coated substrate of claim 5 wherein the metallic material is aluminum.

* * * * *

PO-1050
(5/69)

UNITED STATES PATENT OFFICE
CERTIFICATE OF CORRECTION

Patent No. 3,644,267                                     Dated February 22, 1972

Inventor(s) Winston J. Jackson, Jr. and John R. Caldwell

It is certified that error appears in the above-identified patent and that said Letters Patent are hereby corrected as shown below:

Column 1, line 11, delete second "in"; Column 1, line 35, delete "acceptably" and insert ---unacceptably---; Column 6, line 72, delete "Styrene" and insert ---Styrone---; Column 7, run 28 of Table 1, additive should be ---triphenyl phosphate---; Column 9, line 54, delete "cal./cm./sec./C." and insert ---cal./cm./sec./°C.---; Column 10, Claim 4, line 54, delete "ply(allyl-benzene)" and insert ---poly(allyl-benzene)---.

Signed and sealed this 15th day of August 1972.

(SEAL)
Attest:

EDWARD M.FLETCHER,JR.          ROBERT GOTTSCHALK
Attesting Officer              Commissioner of Patents